United States Patent
Kim et al.

(10) Patent No.: US 11,125,891 B2
(45) Date of Patent: Sep. 21, 2021

(54) METHOD FOR CALCULATING LOCATION INFORMATION AND ELECTRONIC DEVICE THEREFOR

(71) Applicant: SAMSUNG ELECTRONICS CO., LTD., Suwon-si (KR)

(72) Inventors: Jin-Ik Kim, Seoul (KR); Bo-Sung Kwak, Suwon-si (KR); Myeong-Woo Koo, Hwaseong-si (KR); Seung-Yoon Lee, Suwon-si (KR); Chae-Heun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 408 days.

(21) Appl. No.: 16/097,708

(22) PCT Filed: Apr. 12, 2017

(86) PCT No.: PCT/KR2017/003972
§ 371 (c)(1),
(2) Date: Oct. 30, 2018

(87) PCT Pub. No.: WO2017/191908
PCT Pub. Date: Nov. 9, 2017

(65) Prior Publication Data
US 2019/0154843 A1 May 23, 2019

(30) Foreign Application Priority Data

May 3, 2016 (KR) .......................... 10-2016-0054813

(51) Int. Cl.
*G01S 19/48* (2010.01)
*G01S 19/34* (2010.01)
(Continued)

(52) U.S. Cl.
CPC .............. *G01S 19/48* (2013.01); *G01S 19/24* (2013.01); *G01S 19/34* (2013.01); *G01S 19/22* (2013.01); *H04L 67/10* (2013.01); *Y02D 30/70* (2020.08)

(58) Field of Classification Search
CPC .......... G01S 19/22; G01S 19/24; G01S 19/34; G01S 19/48; H04L 67/10
See application file for complete search history.

(56) References Cited

U.S. PATENT DOCUMENTS

2003/0003923 A1* 1/2003 Tsunehara ............... G01S 19/34
455/456.1
2010/0138147 A1* 6/2010 T'Siobbel ............... G01S 19/22
701/533
(Continued)

FOREIGN PATENT DOCUMENTS

KR   10-2014-0048633     4/2014
KR   10-2014-0128733    11/2014
(Continued)

OTHER PUBLICATIONS

International Search Report for PCT/KR2017/003972, dated Jul. 24, 2017, 4 pages.
(Continued)

*Primary Examiner* — Bernarr E Gregory
*Assistant Examiner* — Fred H Mull
(74) *Attorney, Agent, or Firm* — Nixon & Vanderhye, P.C.

(57) ABSTRACT

The present invention relates to a data processing method and apparatus. The invention provides an electronic device including: a communication module; a first location calculating module; a second location calculating module; and a first processor electrically connected to at least one of the first location calculating module and/or the second location calculating module. The first processor may be configured (Continued)

to: identify property information of at least one application that is driven by the first processor and requests location information; determine a location accuracy level on the basis of the identified property information of the at least one application; and select one of the first location calculating module and/or the second location calculating module in order to calculate the location of the electronic device by using a signal obtained through the communication module, according to the determined location accuracy level.

11 Claims, 10 Drawing Sheets

(51) Int. Cl.
G01S 19/24 (2010.01)
G01S 19/22 (2010.01)
H04L 29/08 (2006.01)

(56) References Cited

U.S. PATENT DOCUMENTS

| | | | | |
|---|---|---|---|---|
| 2010/0146242 A1* | 6/2010 | Lee | ............ | G01S 19/34 712/30 |
| 2013/0093627 A1* | 4/2013 | Cosman | ............ | G01S 19/34 342/451 |
| 2013/0162468 A1* | 6/2013 | Kim | ............ | G01S 19/48 342/357.25 |
| 2014/0103315 A1 | 4/2014 | Jung et al. | | |
| 2014/0319523 A1 | 10/2014 | Lee | | |
| 2015/0099546 A1* | 4/2015 | Heo | ............ | G01S 19/48 455/456.3 |
| 2015/0332592 A1* | 11/2015 | Cooper | ............ | G01S 19/22 340/989 |
| 2015/0350825 A1* | 12/2015 | Kim | ............ | G01S 19/34 455/456.1 |
| 2016/0025859 A1* | 1/2016 | Basnayake | ............ | G01S 19/48 342/357.62 |
| 2016/0198560 A1 | 7/2016 | Shin et al. | | |
| 2016/0270234 A1 | 9/2016 | Ahn | | |

FOREIGN PATENT DOCUMENTS

| | | |
|---|---|---|
| KR | 10-2016-0085388 | 7/2016 |
| KR | 10-2016-0087056 | 7/2016 |
| KR | 10-2016-0110861 | 9/2016 |

OTHER PUBLICATIONS

Written Opinion of the ISA for PCT/KR2017/003972, dated Jul. 24, 2017, 7 pages.

* cited by examiner

METHOD FOR CALCULATING LOCATION INFORMATION AND ELECTRONIC DEVICE THEREFOR

CROSS-REFERENCE TO RELATED APPLICATION(S)

This application is a National Phase Entry of PCT International Application No. PCT/KR2017/003972, which was filed on Apr. 12, 2017, and claims priority to Korean Patent Application No. 10-2016-0054813, which was filed on May 3, 2016, the contents of which are incorporated herein by reference.

BACKGROUND

Technical Field

1. Field

Various embodiments of the present disclosure relate to an electronic device and a method for calculating location information.

Background Art

2. Description of the Related Art

An electronic device may obtain location information using at least one positioning scheme (for example, Global Navigation Satellite System (GNSS), Network Location Provider (NLP), and Pedestrian Dead Reckoning (PDR) using an inertial sensor). When location information is requested by at least one application, an electronic device may obtain location information using at least one of the above methods, and may provide the obtained location information to the at least one application.

SUMMARY

When an electronic device obtains location information using the Global Navigation Satellite System (GNSS), the electronic device may receive at least one piece of satellite information through a communication module (for example, a GNSS module) included in the electronic device, and may calculate and obtain location information using a location calculation module (for example, a Position-Velocity-Time (PVT) engine) included in the electronic device on the basis of the at least one piece of satellite information. In this case, the electronic device may calculate the location information using the same location calculation module regardless of the attribute information of an application requesting satellite information and/or location information, thus causing unnecessary power consumption.

Various embodiments of the present disclosure may provide a device and a method for selecting at least one location calculation module among a plurality of location calculation modules on the basis of at least one piece of information, and then calculating location information using the selected location calculation module.

According to various embodiments of the present disclosure, an electronic device may include: a communication module; a first location calculation module; a second location calculation module; and a first processor configured to be electrically connected to at least one of the first location calculation module and/or the second location calculation module, wherein the first processor may be configured to: identify attribute information of at least one application that is driven by the first processor and that requests location information; determine a location accuracy level on the basis of the identified attribute information of the at least one application; and select one of the first location calculation module and/or the second location calculation module to calculate the location of the electronic device using a signal obtained through the communication module according to the determined location accuracy level.

According to various embodiments of the present disclosure, a method for providing location information by an electronic device including a first processor electrically connected to at least one of a first location calculation module and/or a second location calculation module may include: identifying attribute information on at least one application that is driven by the first processor and that requests location information; determining a location accuracy level on the basis of the identified attribute information of the at least one application; selecting one of the first location calculation module and/or the second location calculation module to calculate the location of the electronic device using a signal obtained through a communication module according to the determined location accuracy level; and providing location information using the selected location calculation module.

According to various embodiments of the present disclosure, a computer recording medium may store an instruction which is executed by at least one processor and is readable by a computer, wherein the instruction may be configured to perform, using a first processor: identifying attribute information of at least one application that is driven by the first processor and that requests location information; determining a location accuracy level on the basis of the identified attribute information of the at least one application; selecting one of a first location calculation module and/or a second location calculation module to calculate the location of an electronic device using a signal obtained through a communication module according to the determined location accuracy level; and providing location information using the selected location calculation module.

An electronic device and a method for operating the same, according to various embodiments of the present disclosure, may select a location calculation module on the basis of attribute information of an application or the characteristic of a signal received by the electronic device and may calculate location information using the selected location calculation module, thereby reducing power consumption and efficiently using a plurality of processors included in the electronic device.

DETAILED DESCRIPTION OF EXAMPLE EMBODIMENTS

Figure 1:
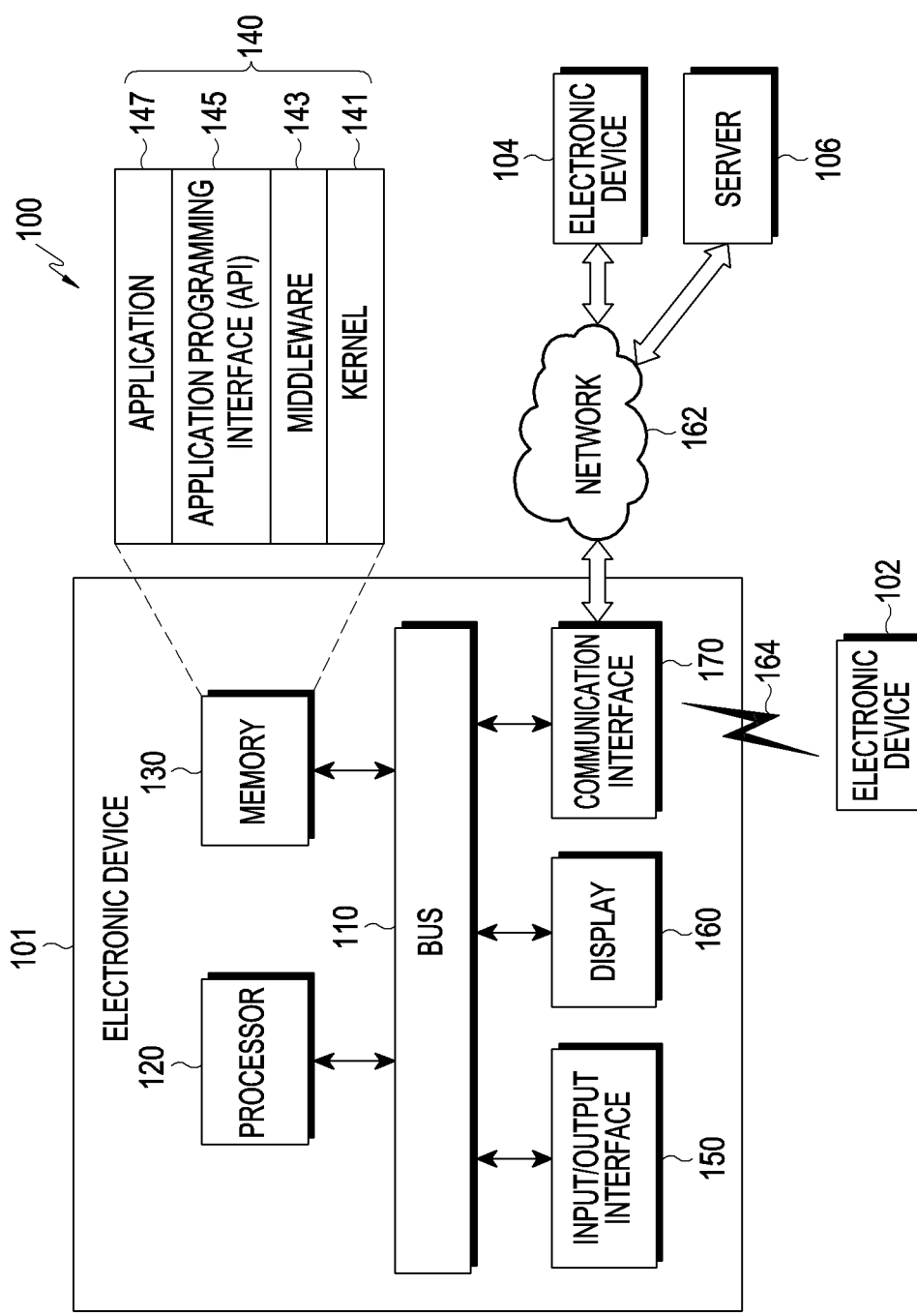
FIG. 1 is a block diagram illustrating an electronic device 101 in a network environment 100 according to various embodiments.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to embodiments of the present disclosure is not limited to the above-described devices. In the present disclosure, the term "user" may indicate a person using an electronic device or a device (e.g., an artificial intelligence electronic device) using an electronic device.

FIG. 1 illustrates an electronic device 101 in a network environment 100 according to various embodiments. The electronic device 101 may include a bus 110, a processor 120, a memory 130, an input/output interface 150, a display 160, and a communication interface 170. In some embodiments, at least one of the components may be omitted, or additional components may be further included in the electronic device 101. The bus 110 may include a circuit that connects the components 110 to 170 to each other and delivers communications (for example, control messages or data) between the components. The processor 120 may include one or more of a Central Processing Unit (CPU), an Application Processor (AP), and a Communication Processor (CP). The processor 120 may control, for example, at least one different component of the electronic device 101, and/or may perform operations relating to communication or data processing.

The memory 130 may include a volatile and/or nonvolatile memory. The memory 130 may store, for example, a command or data related to at least one different component of the electronic device 101. According to one embodiment, the memory 130 may store software and/or a program 140. The program 140 may include, for example, a kernel 141, middleware 143, an Application Programming Interface (API) 145, and/or an application (or "app") 147. At least part of the kernel 141, the middleware 143, and the API 145 may be designated as an operating system. The kernel 141 may control or manage system resources (for example, the bus 110, the processor 120, the memory 130, or the like) used to perform an operation or function implemented in other programs (for example, the middleware 143, the API 145, or the application 147). Further, the kernel 141 may provide an interface that allows the middleware 143, the API 145, or the application 147 to access individual components of the electronic device 101 to thereby control or manage system resources.

The middleware 143 may serve as a relay so that, for example, the API 145 or the application 147 communicates with the kernel 141 to exchange data. Further, the middleware 143 may process one or more requests for operations received from the application 147 according to the priority thereof. For example, the middleware 143 may assign at least one application 147 priority for using system resources of the electronic device 101 (for example, the bus 110, the processor 120, the memory 130, or the like) and may process the one or more requests for operations. The API 145 is an interface for the application 147 to control a function provided from the kernel 141 or the middleware 143, and may include, for example, at least one interface or function (for example, a command) for file control, window control, image processing, or text control. The input/output interface 150 may deliver a command or data, which is input from, for example, a user or a different external device, to a different component(s) of the electronic device 101 or may output a command or data, which is received from a different component(s) of the electronic device 101, to the user or to the different external device.

The display 160 may include, for example, a Liquid Crystal Display (LCD), a Light-Emitting Diode (LED) display, an Organic Light-Emitting Diode (OLED) display, a Micro-Electro-Mechanical Systems (MEMS) display, or an electronic paper display. The display 160 may display, for example, various types of content (for example, text, an image, a video, an icon, and/or a symbol) for the user. The display 160 may include a touch screen and may receive touch, gesture, proximity, or hovering input using, for example, an electronic pen or a body part of a user. The communication interface 170 may establish communication, for example, between the electronic device 101 and an external device (for example, a first external electronic device 102, a second external electronic device 104, or a server 106). For example, the communication interface 170 may be connected to a network 162 via wireless communication or wired communication to communicate with the external device (for example, the second external electronic device 104 or the server 106).

The wireless communication may include cellular communication using, for example, at least one of Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM). According to one embodiment, the wireless communication may include, for example, at least one of Wireless Fidelity (Wi-Fi), Bluetooth, Bluetooth Low Energy (BLE), ZigBee, Near-Field Communication (NFC), Magnetic Secure Transmission, Radio Frequency (RF), and a Body Area Network (BAN). According to one embodiment, the wireless communication may include a Global Navigation Satellite System (GNSS). The GNSS may be, for example, a Global Positioning System (GPS), a Global Navigation Satellite System (GNSS), a BeiDou Navigation Satellite System (hereinafter, "BeiDou"), or Galileo, which is the European global satellite-based navigation system. In the present document, "GPS" may be interchangeably used with "GNSS" hereinafter. The wired communication may include, for example, at least one of Universal Serial Bus (USB), High-Definition Multimedia Interface (HDMI), Recommended Standard 232 (RS-232), power-line communication, and Plain Old Telephone Service (POTS). The network 162 may include a telecommunications network, which may be, for example, at least one of a computer network (for example, a Local Area Network (LAN) or Wide Area Network (WAN)), the Internet, and a telephone network.

Each of the first and second external electronic devices 102 and 104 may be a device of a type that is the same as, or different from, that of the electronic device 101. According to various embodiments, all or some of the operations performed in the electronic device 101 may be performed in another electronic device or a plurality of electronic devices (for example, the electronic devices 102 and 104 or the server 106). According to one embodiment, when the electronic device 101 needs to perform a function or service automatically or upon request, the electronic device 101 may request another electronic device (for example, the electronic device 102 or 104, or the server 106) to perform at least some functions related to the function or service, instead of, or in addition to, autonomously performing the function or service. The other electronic device (for example, the electronic device 102 or 104, or the server 106) may perform the requested functions or additional functions and may transmit the result thereof to the electronic device 101. The electronic device 101 may provide the requested function or service using the received result without change or after additionally processing the result. To this end, cloud-computing, distributed-computing, or client-server-computing technologies may be used.

Figure 2:
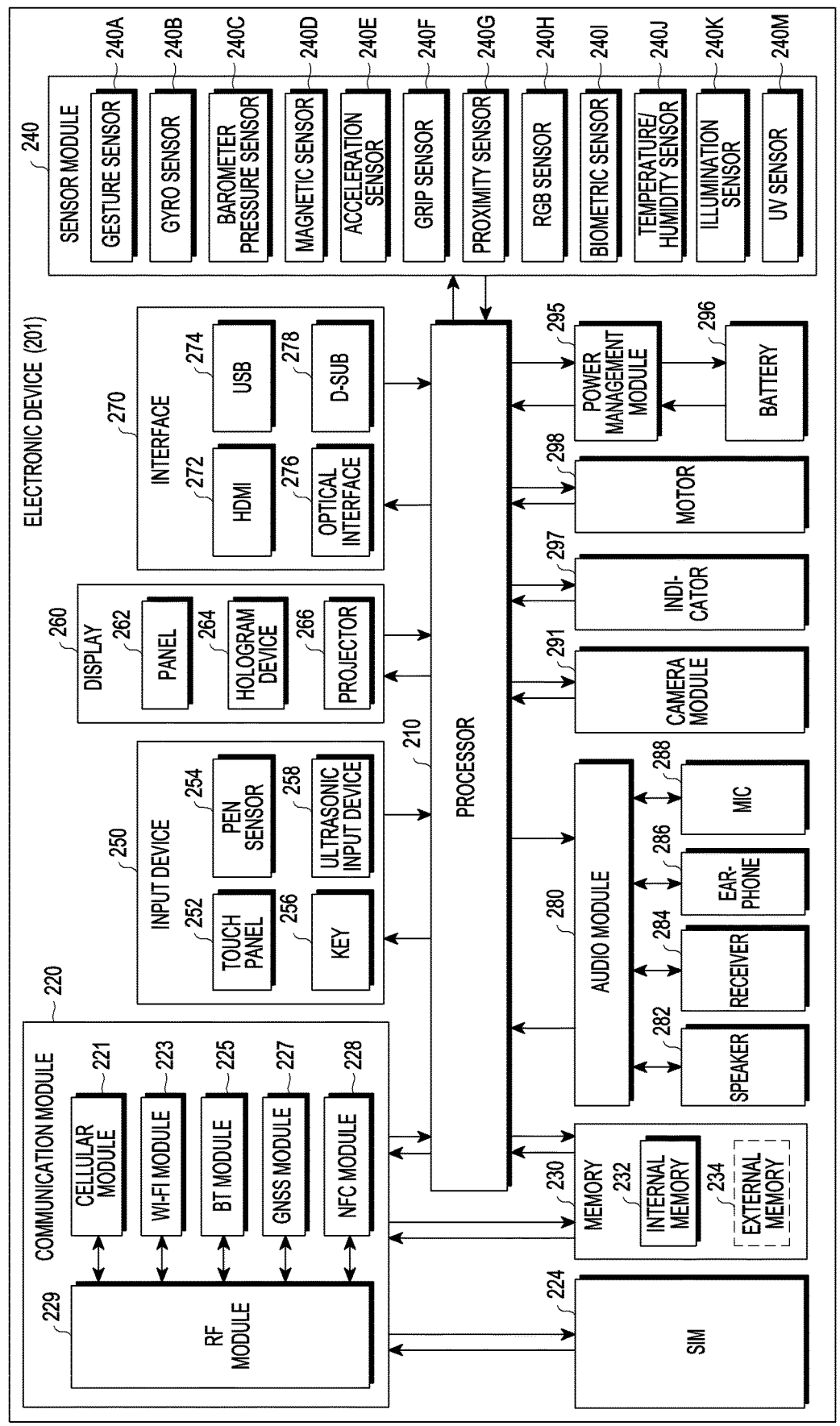
FIG. 2 is a block diagram illustrating an electronic device according to various embodiments.

FIG. 2 is a block diagram illustrating an electronic device 201 according to various embodiments. The electronic device 201 may include, for example, all or part of the electronic device 101 illustrated in FIG. 1. The electronic device 201 may include one or more processors (for example, APs) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298. The processors 210 may run, for example, an operating system or an application to control a plurality of hardware or software components that are connected to the processors 210, and may perform various kinds of data processing and operations. The processors 210 may be configured as, for example, a System on Chip (SoC). According to one embodiment, the processors 210 may further include a Graphic Processing Unit (GPU) and/or an image signal processor. The processors 210 may include at least some (for example, a cellular module 221) of the components illustrated in FIG. 2. The processors 210 may load a command or data received from at least one of other components (for example, nonvolatile memory) into volatile memory to process the command or data, and may store resultant data in the nonvolatile memory.

The communication module 220 may have a configuration that is the same as, or similar to, that of the communication interface 170. The communication module 220 may include, for example, a cellular module 221, a Wi-Fi module 223, a Bluetooth (BT) module 225, a GNSS module 227, a Near-Field Communication (NFC) module 228, and an RF module 229. The cellular module 221 may provide, for example, a voice call, a video call, a text messaging service, or an Internet service through a communication network. According to one embodiment, the cellular module 221 may perform identification and authentication of the electronic device 201 in a communication network using a Subscriber Identity Module (SIM, for example, a SIM card) 224. According to one embodiment, the cellular module 221 may perform at least some of the functions provided by the processors 210. According to one embodiment, the cellular module 221 may include a Communication Processor (CP). According to one embodiment, at least some (for example, two or more) of the cellular module 221, the Wi-Fi module 223, the BT module 225, the GNSS module 227, and the NFC module 228 may be included in one Integrated Chip (IC) or IC package. The RF module 229 may transmit and receive, for example, a communication signal (for example, an RF signal). The RF module 229 may include, for example, a transceiver, a Power Amplifier (amp) Module (PAM), a frequency filter, a Low-Noise Amplifier (LNA), an antenna, or the like. According to another embodiment, at least one of the cellular module 221, the Wi-Fi module 223, the BT module 225, the GNSS module 227, and the NFC module 228 may transmit and receive an RF signal through a separate RF module. The SIM 224 may include, for example, a card including a SIM or an embedded SIM, and may include unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a DRAM, a SRAM, a SDRAM, or the like) and a nonvolatile memory (for example, a OTPROM, a PROM, an EPROM, an EEPROM, a mask ROM, a flash ROM, a flash memory, a hard drive, or a Solid-State Drive (SSD)). The external memory 234 may include a flash drive, for example, a Compact Flash (CF), a Secure Digital (SD), a micro-SD, a mini-SD, an extreme digital (xD), a Multi-Media Card (MMC), a memory stick, or the like. The external memory 234 may be functionally or physically connected to the electronic device 201 through any of various interfaces.

The sensor module 240 may measure, for example, physical quantities, or may detect the state of operation of the electronic device 201 and convert measured or detected information into an electrical signal. The sensor module 240 may include, for example, at least one of a gesture sensor 240A, a gyro sensor 240B, a barometric pressure sensor 240C, a magnetic sensor 240D, an accelerometer 240E, a grip sensor 240F, a proximity sensor 240G, a color sensor 240H (for example, a red, green, and blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control at least one or more sensors belonging thereto. In one embodiment, the electronic device 201 may further include a processor configured, as a part of the processors 210 or separately from the processors 210, to control the sensor module 240, thereby controlling the sensor module 240 while the processors 210 are in a sleep state.

The input device 250 may include, for example, a touch panel 252, a (digital) pen sensor 254, a key 256, or an ultrasonic input device 258. The touch panel 252 may be, for example, at least one of an electrostatic type, a pressure-sensitive type, an infrared type, and an ultrasonic type. Further, the touch panel 252 may additionally include a control circuit. The touch panel 252 may further include a tactile layer to provide a user with a tactile response. The (digital) pen sensor 254 may, for example, be part of the touch panel or may include a separate recognition sheet. The key 256 may include, for example, a physical button, an optical key, or a keypad. The ultrasonic input device 258 may detect ultrasonic waves, generated from an input tool, via a microphone (for example, a microphone 288) in the electronic device 201 and may identify data corresponding to the detected ultrasonic waves.

The display 260 (for example, the display 160) may include a panel 262, a hologram device 264, a projector 266, and/or a control circuit to control these components. The panel 262 may be configured, for example, to be flexible, transparent, or wearable. The panel 262 may be formed with the touch panel 252 in one or more modules. The hologram device 264 may display a three-dimensional image in the air using light interference. The projector 266 may project light onto a screen to display an image. The screen may be disposed, for example, inside or outside the electronic device 201. The interface 270 may include, for example, a HDMI 272, a USB 274, an optical interface 276, or a D-subminiature (D-sub) interface 278. The interface 270 may be included, for example, in the communication interface 170 illustrated in FIG. 1. Additionally or alternatively, the interface 270 may include, for example, a Mobile High-Definition Link (MHL) interface, a SD card/Multi-Media Card (MMC) interface, or an Infrared Data Association (IrDA) interface.

The audio module 280 may bidirectionally convert, for example, a sound and an electrical signal. At least some components of the audio module 280 may be included, for example, in the input/output interface 150 illustrated in FIG. 1. The audio module 280 may process sound information input or output, for example, through a speaker 282, a receiver 284, earphones 286, or the microphone 288. The camera module 291 is a device that takes, for example, a still image and a video. According to one embodiment, the camera module 291 may include one or more image sensors (for example, a front sensor or a rear sensor), a lens, an Image Signal Processor (ISP), or a flash (for example, an LED, a xenon lamp, or the like). The power management module 295 may manage, for example, the power of the electronic device 201. According to one embodiment, the power management module 295 may include a Power Management Integrated Circuit (PMIC), a charger IC, or a battery or fuel gauge. The PMIC may have wired and/or wireless charging methods. The wireless charging methods may include, for example, a magnetic resonance method, a magnetic induction method, or an electromagnetic wave method, and may further include an additional circuit for wireless charging, such as a coil loop, a resonance circuit, or a rectifier. The battery gauge may measure, for example, the remaining battery charge, the charging voltage, the current, or the temperature of the battery 296. The battery 296 may include, for example, a rechargeable battery and/or a solar battery.

The indicator 297 may display the specific state of the electronic device 201 or a component thereof (for example, the processors 210), which may be, for example, a booting state, a message state, or a charging state. The motor 298 may convert an electrical signal into mechanical vibrations, and may generate vibrations or a haptic effect. The electronic device 201 may include a mobile TV support device (for example, a GPU) that is capable of processing media data in accordance with, for example, Digital Multimedia Broadcasting (DMB), Digital Video Broadcasting (DVB), or mediaFlo™ standards. Each element mentioned in the present document may include one or more components, and may be designated by different terms depending on the type of the electronic device. In various exemplary embodiments, an electronic device (for example, the electronic device 201) may be configured such that some elements are omitted, additional elements are further included, or some of the elements are combined into one entity, which may perform the same functions as those of the corresponding elements before combination.

Figure 3:
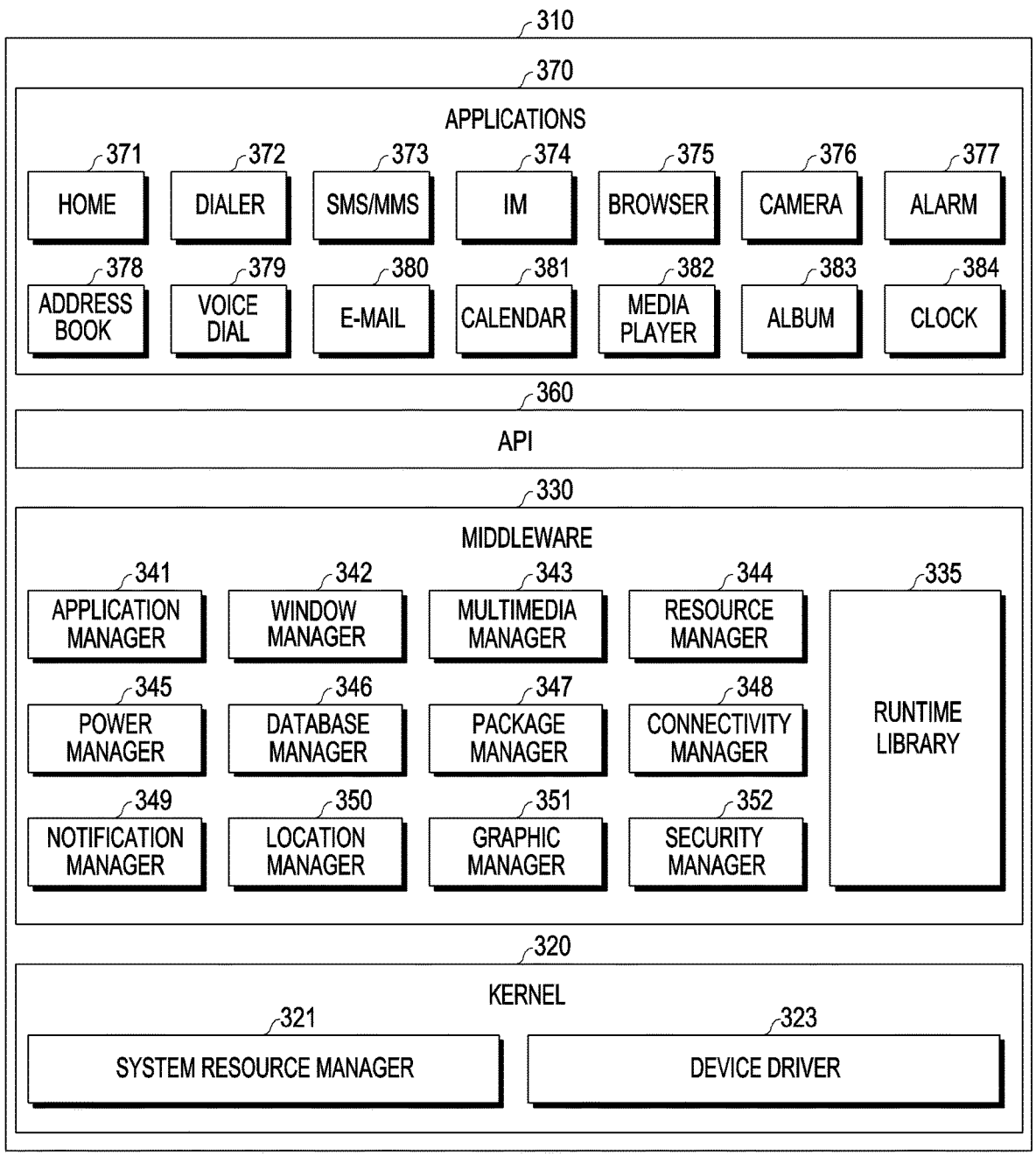
FIG. 3 is a block diagram illustrating a program module according to various embodiments.

FIG. 3 is a block diagram illustrating a program module according to various embodiments. According to one embodiment, the program module 310 (for example, the program 140) may include an operating system that controls resources related to an electronic device (for example, the electronic device 101) and/or various applications (for example, the application 147) that run on the operating system. The operating system may be, for example, Android™, iOS™, Windows™, Symbian™, Tizen™, or Bada™. Referring to FIG. 3, the program module 310 may include a kernel 320 (for example, the kernel 141), middleware 330 (for example, the middleware 143), an API 360 (for example, the API 145), and/or an application 370 (for example, the application 147). At least part of the program module 310 may be preloaded onto the electronic device, or may be downloaded from an external electronic device (for example, the electronic device 102 or 104 and the server 106).

The kernel 320 may include, for example, a system resource manager 321 and/or a device driver 323. The system resource manager 321 may perform control, allocation, or recovery of system resources. According to one embodiment, the system resource manager 321 may include a process management unit, a memory management unit, or a file-system management unit. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. The middleware 330 may provide, for example, functions commonly needed for applications 370, or may provide the applications 370 with various functions through the API 360 so that the applications 370 may use the limited systems resources in the electronic device. According to one embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a complier to add a new function through a programming language while the application 370 is running. The runtime library 335 may perform input/output management, memory management, or arithmetic function processing. The application manager 341 may manage, for example, the life cycle of the application 370. The window manager 342 may manage Graphic User Interface (GUI) resources used for a screen. The multimedia manager 343 may identify formats that are necessary to play media files, and may encrypt or decrypt a media file using a codec suitable for a corresponding format. The resource manager 344 may manage source code or memory space for the application 370. The power manager 345 may manage, for example, the capacity or power supply of a battery and may provide information on power necessary for the operation of the electronic device. According to one exemplary embodiment, the power manager 345 may interwork with a Basic Input/Output System (BIOS). The database manager 346 may generate, retrieve, or change a database to be used for, for example, the application 370. The package manager 347 may manage the installation or update of an application distributed in the form of a package file.

The connectivity manager 348 may manage, for example, wireless connectivity. The notification manager 349 may provide a user with an event, for example, an incoming message, an appointment, and a proximity notification. The location manager 350 may manage, for example, information about the location of the electronic device. The graphic manager 351 may manage, for example, a graphic effect to be provided for the user or a user interface related to the graphic effect. The security manager 352 may provide, for example, system security or user authentication. According to one exemplary embodiment, the middleware 330 may include a telephony manager to manage a voice or video call function of the electronic device or a middleware module that is capable of forming combinations of functions of the foregoing elements. According to one exemplary embodiment, the middleware 330 may provide a specialized module for each operating system. The middleware 330 may dynamically delete some of the existing elements or add new elements. The API 360 is, for example, a set of API programming functions, and may be provided with a different configuration depending on the operating system. For example, one API set for each platform may be provided in the case of Android or iOS, while two or more API sets for each platform may be provided in the case of Tizen.

The application 370 may include, for example, a home screen 371, a dialer 372, an SMS/MMS 373, Instant Messaging (IM) 374, a browser 375, a camera 376, an alarm 377, an address book 378, a voice dialer 379, email 380, a calendar 381, a media player 382, an album 383, a clock 384, a healthcare application (for example, for measuring exercise or blood sugar), or an environmental data application (for example, for providing atmospheric pressure, humidity, or temperature data). According to one exemplary embodiment, the application 370 may include an information exchange application that is capable of supporting information exchange between the electronic device and an external electronic device. The information exchange application may include, for example, a notification relay application for relaying specific information to the external electronic device or a device management application for managing the external electronic device. For example, the notification relay application may relay notification information, which is generated in another application of the electronic device, to the external electronic device, or may receive notification information from the external electronic device and provide the notification information to the user. The device management application may install, delete, or update, for example, a function (for example, a function of turning on/turning off the external electronic device itself (or some components thereof) or adjusting the brightness (or resolution) of a display) of an external electronic device communicating with the electronic device or an application operating in the external electronic device. According to one exemplary embodiment, the application 370 may include an application (for example, a healthcare application of a mobile medical device) assigned according to the attributes of the external electronic device. According to one exemplary embodiment, the application 370 may include an application received from the external electronic device. At least part of the program module 310 may be implemented (for example, run) by software, firmware, hardware (for example, the processors 210), or combinations of at least two or more thereof, and may include a module, a program, a routine, sets of instructions, or a process to perform one or more functions.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Figure 4:
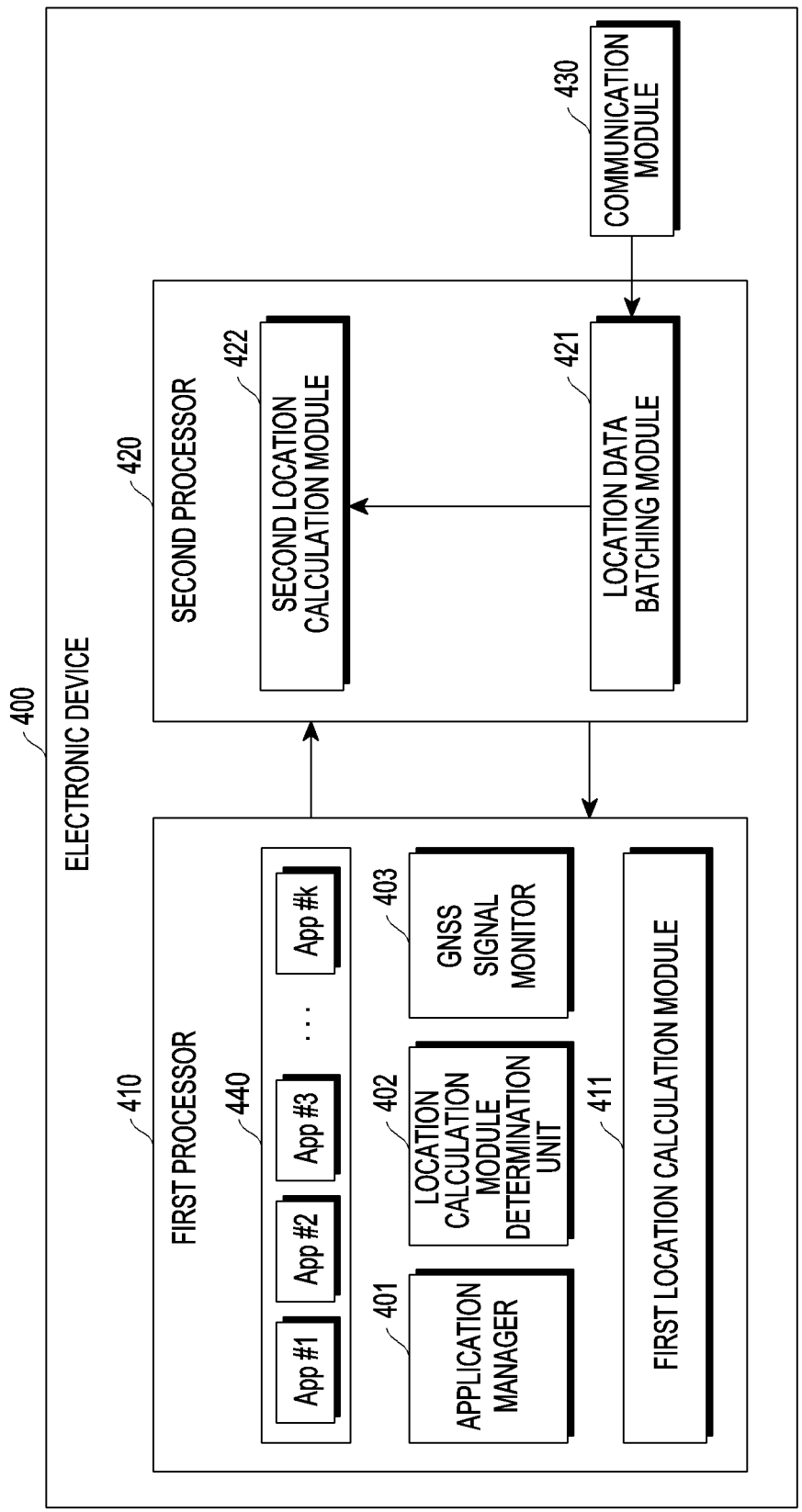
FIG. 4 is a block diagram illustrating an electronic device for calculating location information according to various embodiments of the present disclosure.

FIG. 4 is a block diagram illustrating an electronic device 400 for calculating location information according to various embodiments of the present disclosure. According to one embodiment, the electronic device 400 may include the entirety or part of the electronic device 101 of FIG. 1 or the electronic device 201 of FIG. 2.

Referring to FIG. 4, the electronic device 400 may include a first processor 410, a second processor 420, and a communication module 430.

According to various embodiments, the first processor 410 may process at least some of the information obtained from other components (at least one of the processor 120, the memory 130, the input/output interface 150, the display 160, and the communication interface 170 of FIG. 1) and may use the information in a variety of ways. For example, the first processor 410 may control at least some functions of the electronic device 101 so that the electronic device 101 interworks with another electronic device (for example, the electronic device 102 or 104 or the server 106). The first processor 410 may be integrated into the processor 120 or the communication interface 170. According to various embodiments, at least one component of the first processor 410 may be included in the server 106, and at least one operation implemented in the first processor may be supported by the server 106. Here, the first processor 410 may have the same configuration as the processor 120 and may be termed an "application processor", "main processor", "processor 1", "central processing unit", "CPU", "high-power processor", "high-performance processor", or "AP".

According to various embodiments, the second processor 420 is provided separately from the first processor 410 and is configured to be optimized for a low-power operation. The second processor 420 may be configured to be able to continuously operate with relatively minimal current consumption by having less computing power than the first processor 410 and including limited interfaces and memory. In addition, the second processor 420 may be configured to control at least one sensor. Further, the second processor 420 may collect sensing data from the at least one sensor and may batch the collected sensing data for transmitting to the first processor 410 while the first processor 410 is in an inactive state, a low-power state, or a sleep state. For example, the second processor 420 may be a processor that controls a communication module (for example, a GPS module, a Wi-Fi module, a BT module, an NFC module, or an RF module) or a processor that controls a sensor module (for example, an accelerometer, a gyro sensor, a geomagnetic sensor, or an altitude sensor). Here, the second processor 420 may be termed a "coprocessor", "sub-processor", "processor 2", "sensor hub", "microcontroller", "sensing processor", "SP".

According to various embodiments of the present disclosure, the first processor 410 may be electrically connected to or include a first location calculation module 411. The second processor 420 may be electrically connected to or include a second location calculation module 422.

According to various embodiments, the first location calculation module 411 may be included in the first processor 410 and may be a module driven by the first processor 410. The first location calculation module 411 may be capable of calibrating an algorithm in real time using a large number of measurements and may calculate more accurate location information using GNSS signal data. For example, in calculating location information using GNSS signal data received from the communication module 430, the first location calculation module 411 may use a high-performance CPU and data processing memory and may use all satellite data information of 32 channels of a GPS, GLONASS, BeiDou, QZSS, and SBAS included in the GNSS signal data from a full Management Engine (ME). Further, the first location calculation module 411 may perform an estimation algorithm having a large amount of iterations using the data of the full ME using a full. Position Engine (PE), thereby calculating high-resolution information from measurements. In addition, when the environmental state of the GNSS signal data is a weak electric field, the first location calculation module 411 may calculate location information with increased accuracy from the GNSS signal data, compared to the second location calculation module 422 of the second processor 420. The first location calculation module 411 requires more data in order to process the algorithm and thus may receive the GNSS signal data in a relatively shorter period than the second location calculation module 422 of the second processor 420.

According to various embodiments, the second location calculation module 422 may be included in the second processor 420 and may be a module driven by the second processor 420. According to various embodiments, the second location calculation module 422 may be disposed in the communication module 430. The second location calculation module 422 may calculate location information using GNSS signal data received from the communication module 430 and may then provide the calculated location information to an application running on the first processor 410. The second location calculation module 422 may process an algorithm that has been made more lightweight so as to be appropriate for the limited processing calculation capacity of the CPU. For example, in calculating location information using GNSS signal data received from the communication module 430, the second location calculation module 422 may restrictively use the CPU and the processing memory and may use only satellite data information of 12 channels of GPS and GLONASS included in the GNSS signal data from a mini ME. As a mini PE is used, when the environmental state of the GNSS signal data is a weak electric field, the second location calculation module 422 may calculate location information with reduced accuracy from the GNSS signal data, compared to the first location calculation module 411 of the first processor 410. Instead, the second location calculation module 422 can calculate location information by receiving the GNSS signal data in a relatively longer period than the first location calculation module 411 of the first processor 410. Thus, when location information is calculated in the second location calculation module 422, it is possible to reduce the wakeup time of the first processor 410.

Performance information on the first location calculation module 411 and the second location calculation module 422, according to various embodiments, may be as shown below in Table 1.

application capable of providing a healthcare function (for example, measuring exercise, blood sugar, or calories), an environmental data function (for example, providing atmospheric pressure, humidity, or temperature data), or a situation recognition function (for example, location tracking or providing activity conditions). The application 440 may need location information calculated using GNSS signal data obtained from the communication module 430 in order to perform an operation for providing the aforementioned functions. In addition, the application 440 may transmit application attribute information to the first processor 410 in order to receive location information required by the application 440.

The application attribute information may include the accuracy of location information required according to the service of the application 440. For example, the accuracy of location information may be divided into two grades or into a plurality of grades according to the type of service of an application. For example, the application 440 may periodically obtain location information and may provide a service based on a geofence, which refers to a virtual boundary surrounding a particular area. When the application 440 is a geofence service, the required accuracy of location information may be low. The application 440 may provide an exercise goal notification service that notifies a user that an exercise goal set by the user is achieved when the user works out. When the application 440 is an exercise goal service, the accuracy of location information may be required to be high. Here, regarding the accuracy of the location information, low accuracy and high accuracy are represented in relative terms when divided into two grades, and the accuracy may also be divided into various grades.

According to various embodiments, the application manager 401 may receive the application attribute information from the at least one application 440 that is driven by the first processor 410 and that requests location information. The application manager 401 may identify the received application attribute information and may determine a location accuracy level on the basis of the identified application

TABLE 1

| Processing module | Full ME | Full PE | Mini ME | Mini Pe | Accuracy | Batching period | Current consumption | Measurement calculation iteration numbers |
|---|---|---|---|---|---|---|---|---|
| First location calculation module | ○ | ○ | X | X | High | Average | High | 10,000 |
| Second location calculation module | X | X | ○ | ○ | Low | Long | Low | 1,000 |

According to various embodiments of the present disclosure, the first processor 410 may perform the function of selecting one of the first location calculation module 411 and/or the second location calculation module 422 to calculate the location of the electronic device according to at least one application that is driven by the first processor 410 and that requests location information. To perform this function, the first processor 410 may include at least one application 440, an application manager 401, a location calculation module determination unit 402, and a GNSS signal monitor 403. Here, the location calculation module determination unit 402 and the GNSS signal monitor 403 may be included in the second processor 420.

According to various embodiments, the at least one application 440 may be stored in the memory 130 illustrated in FIG. 1 and may include at least one application App#1, App#2, App#3, and App#k. The application 440 may be an attribute information. The application manager 401 may transmit the determined location accuracy level to the location calculation module determination unit 402. The location accuracy level may be a value indicating the accuracy of the location information of the application attribute information. For example, the location accuracy level may be divided into a first location accuracy level and a second location accuracy level. The first location accuracy level may indicate that location information accuracy is relatively higher than the second location accuracy level.

According to various embodiments, the location calculation module determination unit 402 may select one of the first location calculation module 411 and/or the second location calculation module 422 in order to calculate the location of the electronic device according to the location accuracy level transmitted from the application manager 401. When the location accuracy level is the first location accuracy level, the location calculation module determination unit 402 may select the first location calculation module 411. When the location accuracy level is the second location accuracy level, the location calculation module determination unit 402 may select the second location calculation module 422. The location calculation module determination unit 402 may transmit information on the selected location calculation module to the second processor 420.

According to various embodiments, when location information of time electronic device, which is calculated by the first location calculation module 411 and/or the second location calculation module 422 selected by the location calculation module determination unit 402, is provided to the application 440, the GNSS signal monitor 403 may receive GNSS signal data used by the first location calculation module 411 and/or the second location calculation module 422 in order to calculate the location information of the electronic device. The GNSS signal monitor 403 may receive the GNSS signal data from the first location calculation module 410 and/or the second location calculation module 422, or may receive the GNSS signal data from the second processor 420. The GNSS signal monitor 403 may determine the characteristic of the GNSS signal by using at least one piece of information included in the received GNSS signal data and may determine the signal level on the basis of the determined signal characteristic. The GNSS signal monitor 403 may transmit the determined signal level to the location calculation module determination unit 402. The at least one piece of information included in the GNSS signal data may be information on an environmental factor that may affect the accuracy of the GNSS signal. The information may include at least one of GNSS signal strength, an error radius, location variation, horizontal dilution of precision (HDOP), the number of GNSS satellites, and the possibility of multipath. The GNSS signal monitor 403 may determine a signal characteristic regarding a reception environment of the GNSS signal by using at least one of GNSS signal strength, an error radius, location variation, HDOP, the number of GNSS satellites, and the possibility that multipath is included in the GNSS signal data. The signal characteristic may be represented by a numerical value obtained by digitizing a single piece of information or combined pieces of information having high correlation among the information. The GNSS signal monitor 403 may compare the numerical value of the determined signal characteristic with a threshold value for classifying the reception environment of the GNSS signal into a weak electric field and a strong electric field. When the numerical value of the signal characteristic exceeds the threshold value, the GNSS signal monitor 403 may determine that the signal level is a first signal level. When the numerical value of the signal characteristic is below the threshold value, the GNSS signal monitor 403 may determine that the signal level is a second signal level. The first signal level may indicate that the reception environment of the GNSS signal is a strong electric field, and the second signal level may indicate that the reception environment of the GNSS signal is a weak electric field.

According to various embodiments, the GNSS signal data may include the information illustrated below in Table 2.

TABLE 2

| Information | Weak electric field | Strong electric field |
| --- | --- | --- |
| Number of GNSS satellites | Small | Large |
| Error radius | Wide | Narrow |

TABLE 2-continued

| Information | Weak electric field | Strong electric field |
| --- | --- | --- |
| Location variation | Great | Small |
| HDOP | High | Low |
| SNR | Low | High |
| Possibility of multipath | High | Low |

According to various embodiments, the location calculation module determination unit 402 may select one of the first location calculation module 411 and/or the second location calculation module 422 in order to calculate the location of the electronic device according to the signal level transmitted from the GNSS signal monitor 403. When the signal level is the first signal level, the location calculation module determination unit 402 may select the second location calculation module 422. When the signal level is the second signal level, the location calculation module determination unit 402 may select the first location calculation module 411. The location calculation module determination unit 402 may transmit information on the selected location calculation module to the second processor 420.

According to various embodiments of the present disclosure, the second processor 420 may perform a function of collecting GNSS signal data obtained through the communication module 430 in conjunction with the communication module 430 and hatching the collected GNSS signal data for transmitting to the selected location calculation module among the first location calculation module 411 and/or the second location calculation module 422. To perform this function, the second processor 420 may include a location data batching module 421.

According to various embodiments, the location data batching module 421 may collect GNSS signal data obtained through the communication module 430 in conjunction with the communication module 430 and may configure batched data according to a preset hatching period. The location data batching module 421 may receive information on a location calculation module selected by the location calculation module determination unit 402 of the first processor 410. The location data hatching module 421 may transmit the batched data to the first location calculation module 411 and/or the second location calculation module 422 selected by the location calculation module determination unit 402 of the first processor 410.

Figure 5:
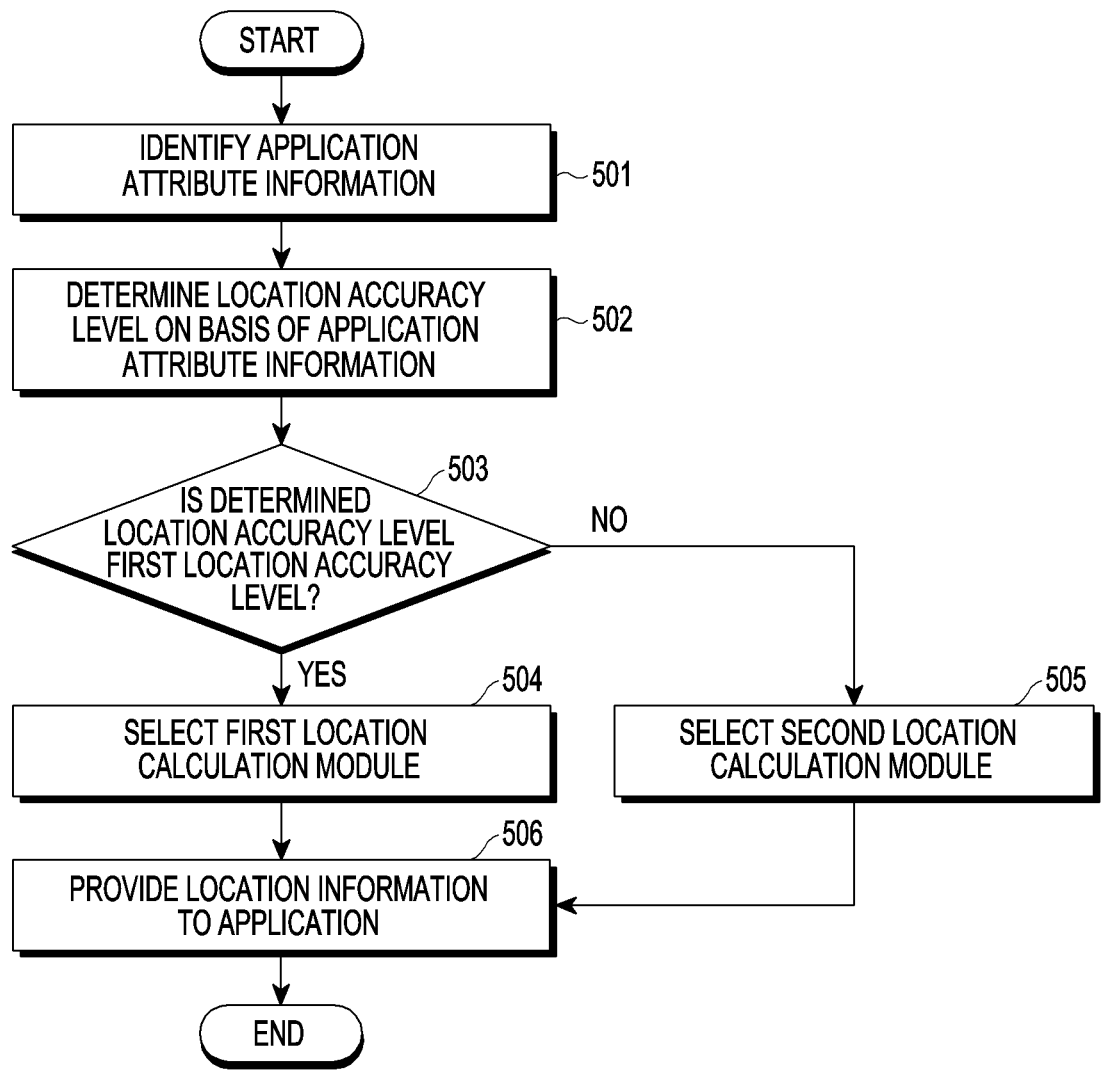
FIG. 5 is a flowchart illustrating a process for selecting a location calculation module to calculate location information on an electronic device according to various embodiments of the present disclosure.

FIG. 5 is a flowchart illustrating a process for selecting a location calculation module to calculate location information of an electronic device according to various embodiments of the present disclosure.

Hereinafter, a process for selecting a location calculation module to calculate location information of an electronic device, according to various embodiments of the present disclosure, will be described with reference to FIG. 5.

In operation 501, the first processor 410 may receive application attribute information from at least one application that is driven by the first processor 410 and that requests location information and may identify the received application attribute information. The application attribute information may include the accuracy of location information required by the application.

In operation 502, the first processor 410 may determine a location accuracy level on the basis of the application attribute information. The location accuracy level may be a value indicating the accuracy of the location information of the application attribute information. For example, the location accuracy level may be divided into a first location accuracy level and a second location accuracy level. The first location accuracy level may indicate a relatively higher accuracy than the second location accuracy level.

When the determined location accuracy level is the first location accuracy level in operation 503, the first processor 410 may select the first location calculation module 411 as a location calculation module to calculate the location of the electronic device in operation 504. When the determined location accuracy level is the second location accuracy level, the first processor 410 may select the second location calculation module 422 as a location calculation module to calculate the location of the electronic device in operation 505.

In operation 506, the first processor 410 may provide location information calculated by the first location calculation module 411 and/or the second location calculation module 422 to the application.

Figure 6:
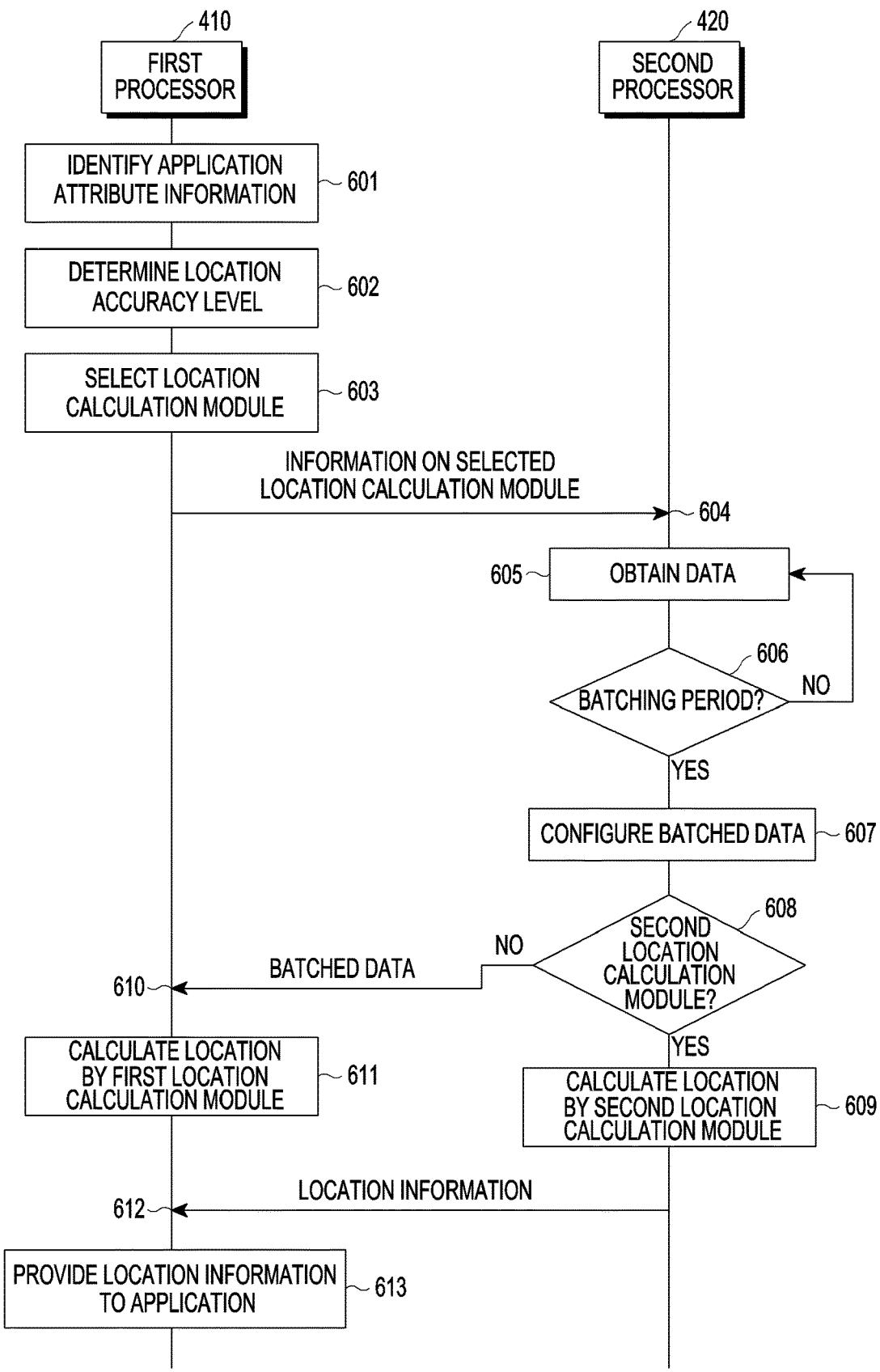
FIG. 6 is a flowchart illustrating a data-processing process for calculating location information on an electronic device according to various embodiments of the present disclosure.

FIG. 6 is a flowchart illustrating a data-processing process for calculating location information of an electronic device according to various embodiments of the present disclosure.

Hereinafter, a data-processing process for providing location information of an electronic device according to various embodiments of the present disclosure will be described with reference to FIG. 6.

In operation 601, the first processor 410 may receive application attribute information from at least one application that is driven by the first processor 410 and that requests location information and may identify the received application attribute information.

In operation 602, the first processor 410 may determine a location accuracy level on the basis of the application attribute information.

In operation 603, the first processor 410 may select one of the first location calculation module 411 and/or the second location calculation module 422 to calculate the location of the electronic device using GNSS signal data according to the determined location accuracy level.

In operation 604, the first processor 410 may transmit information on the selected location calculation module to the second processor 420.

In operation 605, the second processor 420 may obtain GNSS signal data through the communication module 430 functionally connected to the second processor 420.

In operation 606, the second processor 420 may store the obtained GNSS signal data and may determine whether a preset hatching period has begun. The batching period may be set in advance or may be changed according to whether or not the memory of the second processor 420 has reached a threshold capacity, the capacity of transmission between the processors, and the speed of the transmission. Before the hatching period, the second processor 420 may continue to collect data in operation 605.

In operation 607, when the batching period has come, the second processor 420 may configure batched data including the obtained and stored GNSS signal data.

In operation 608, the second processor 420 may check the information on the location calculation module selected by the first processor 410. When the determined location calculation module is the second location calculation module, the second processor 420 may transmit the batched data including the GNSS signal data to the second location calculation module 422, so that the second location calculation module 422 may calculate location information of the electronic device in operation 609. In operation 612, the second processor 420 may transmit the location information calculated by the second location calculation module 422 to the first processor 410.

When the determined location calculation module is not the second location calculation module in operation 608, the second processor 420 may transmit the batched data including the GNSS signal data to the first processor 410 in operation 610.

In operation 611, when the first processor 410 receives the batched data including the GNSS signal data from the second processor 420, the first location calculation module 411 may calculate location information of the electronic device.

In operation 613, the first processor 410 may provide the location information calculated by the first location calculation module 411 and/or the second location calculation module 422 to the application.

Figure 7:
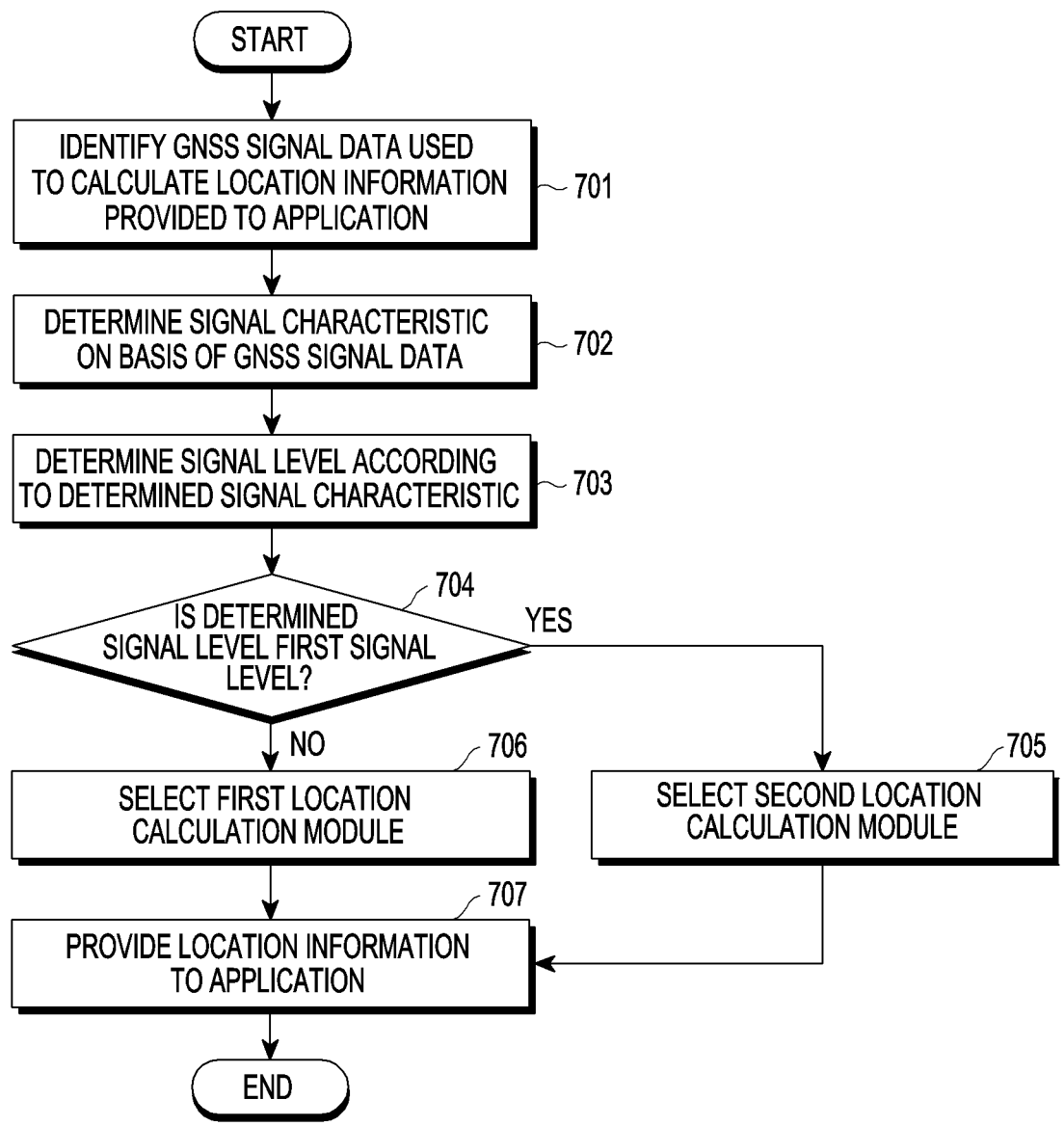
FIG. 7 is a flowchart illustrating a process for selecting a location calculation module to calculate location information on an electronic device according to various embodiments of the present disclosure.

FIG. 7 is a flowchart illustrating a process for selecting a location calculation module to calculate location information of an electronic device according to various embodiments of the present disclosure.

Hereinafter, a process for selecting a location calculation module to calculate location information of an electronic device according to various embodiments of the present disclosure will be described with reference to FIG. 7.

In operation 701, when location information of an electronic device calculated by the first location calculation module 411 and/or the second location calculation module 422 is provided to the application 147, the first processor 410 may receive GNSS signal data used by the first location calculation module 411 and/or the second location calculation module 422 to calculate the location information of the electronic device and may identify the received GNSS signal data. The GNSS signal data may be received from the first location calculation module 410 and/or the second location calculation module 422 or from the second processor 420.

In operation 702, the first processor 410 may determine a characteristic of a GNSS signal by using at least one piece of information included in the GNSS signal data. The at least one piece of information included in the GNSS signal data may be information on an environmental factor that may affect the accuracy of the GNSS signal, The information may include at least one of GNSS signal strength, an error radius, location variation, HDOP, the number of GNSS satellites, and the possibility of multipath. The first processor 410 may determine a signal characteristic regarding the reception environment of the GNSS signal by using at least one of GNSS signal strength, an error radius, location variation, HDOP, the number of GNSS satellites, and the possibility of multipath included in the GNSS signal data The signal characteristic may he represented by a numerical value obtained by digitizing a single piece of information or combined pieces of information having high correlation among the information.

In operation 703, the first processor 410 may determine a signal level according to the determined signal characteristic. The first processor 410 may compare the numerical value of the determined signal characteristic with a threshold value for classifying the reception environment of the GNSS signal into a weak electric field and a strong electric field. When the numerical value of the signal characteristic exceeds the threshold value, the GNSS signal monitor 403 may determine that the signal level is a first signal level. When the numerical value of the signal characteristic is below the threshold value, the GNSS signal monitor 403 may determine that the signal level is a second signal level. The first signal level may indicate that the reception environment of the GNSS signal is a strong electric field, and the second signal level may indicate that the reception environment of the GNSS signal is a weak electric field.

When the determined signal level is the first signal level in operation 704, the first processor 410 may select the second location calculation module 422 as a location calculation module to calculate the location of the electronic device in operation 705. When the determined signal level is the second signal level, the first processor 410 may select the first location calculation module 411 as a location calculation module to calculate the location of the electronic device in operation 706.

In operation 707, the first processor 410 may provide the location information calculated by the first location calculation module 411 and/or the second location calculation module 422 to the application.

Figure 8:
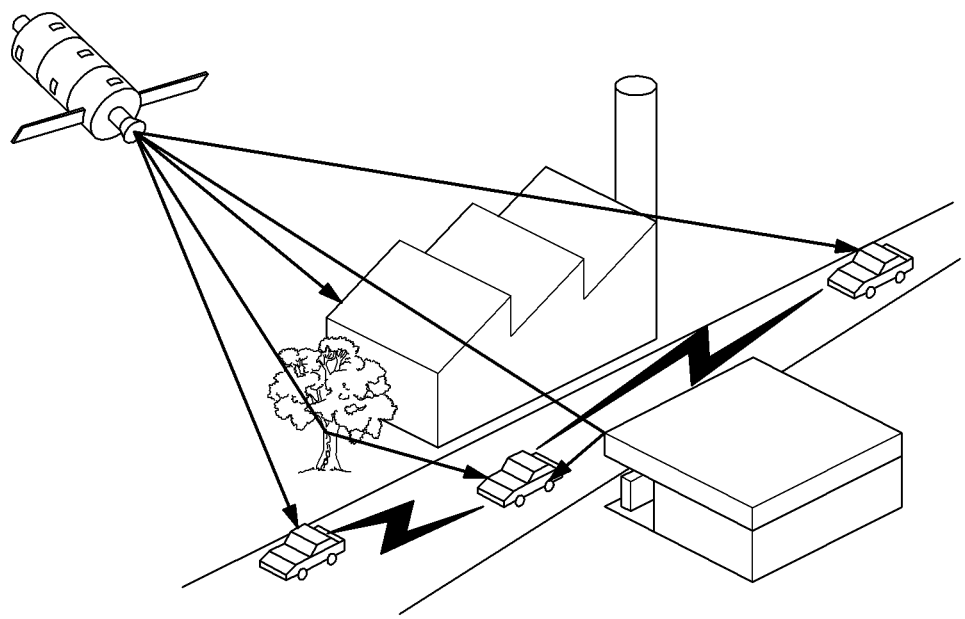
FIG. 8 illustrates the multipath of a GNSS signal according to various embodiments of the present disclosure.
Figure 9:
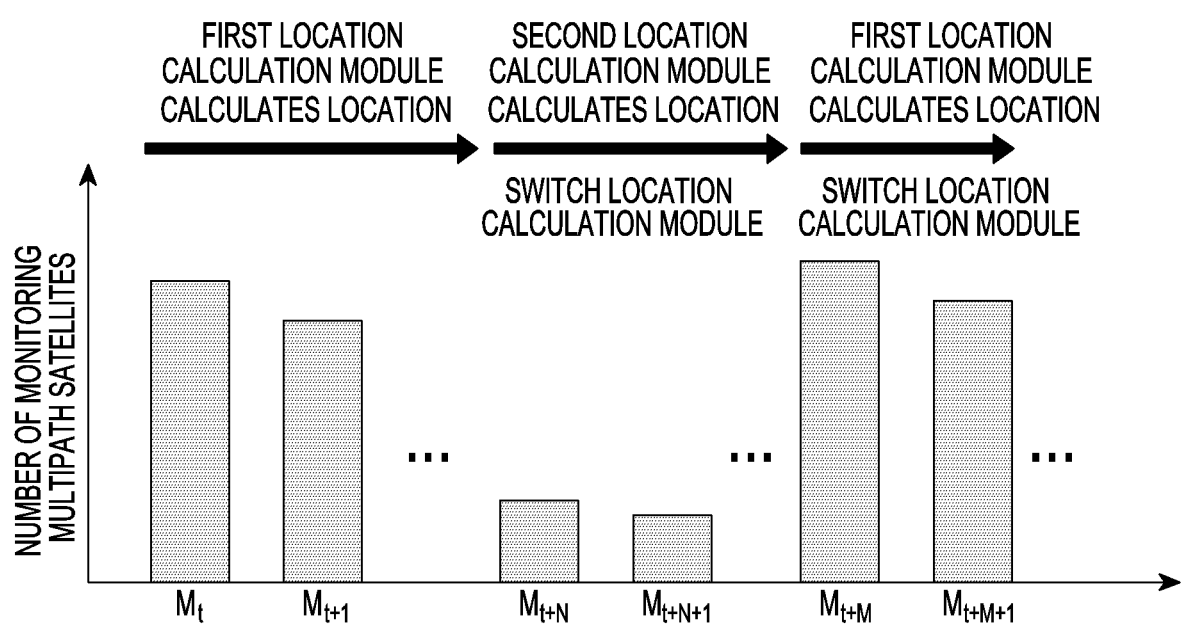
FIG. 9 illustrates a method for selecting a location calculation module according to the multipath of a GNSS signal according to various embodiments of the present disclosure.
Figure 10:
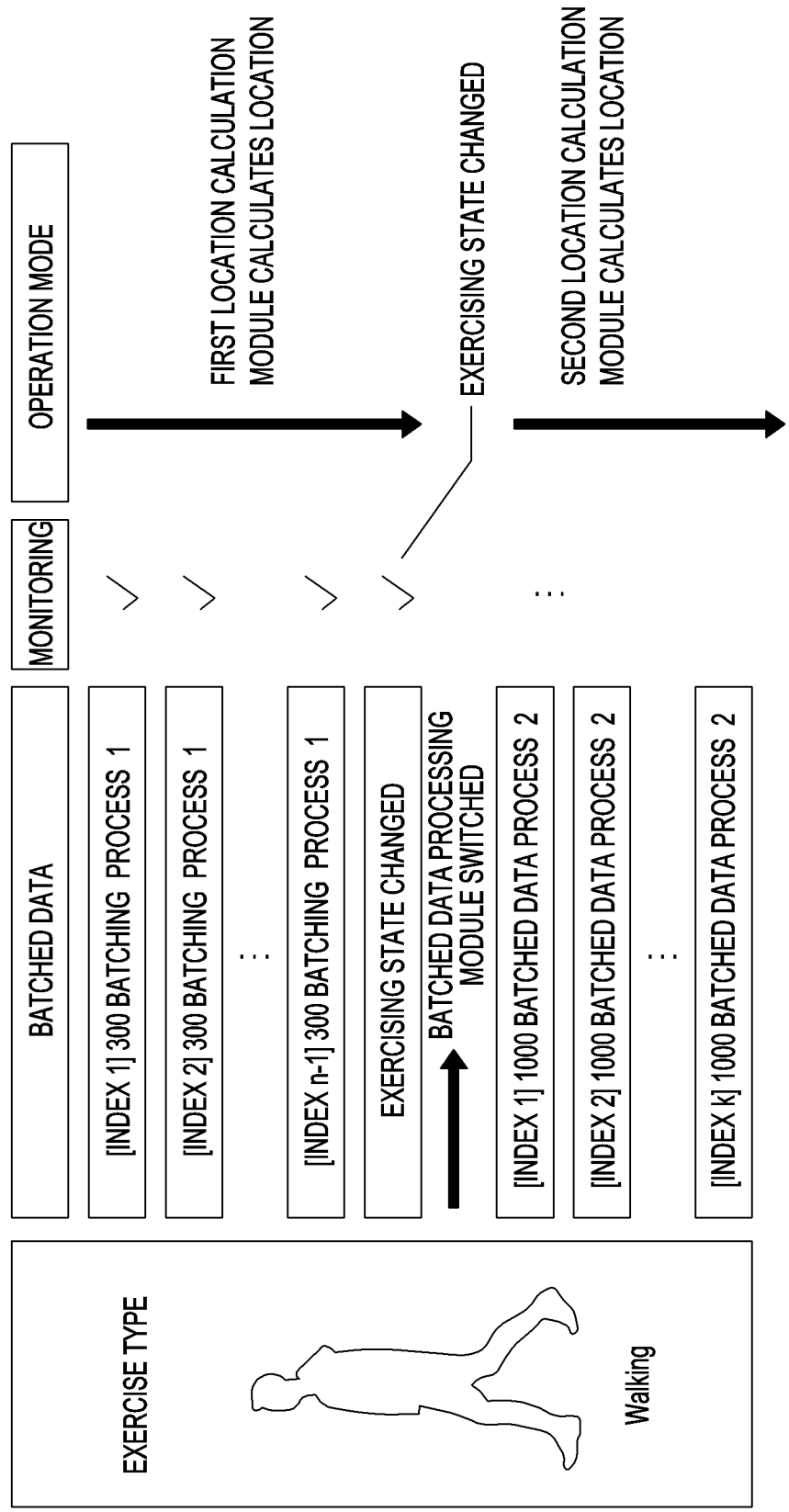
FIG. 10 illustrates a method for selecting a location calculation module according to a user's exercising state according to various embodiments of the present disclosure.

FIG. 8 illustrates the multipath of a GNSS signal according to various embodiments of the present disclosure, FIG. 9 illustrates a method for selecting a location calculation module according to the multipath of a GNSS signal according to various embodiments of the present disclosure, and FIG. 10 illustrates a method for selecting a location calculation module according to a user's exercising state according to various embodiments of the present disclosure.

According to various embodiments, GNSS signal data may include information illustrated above in Table 2.

Referring to Table 2, among the information included in the GNSS signal data used for determining a signal characteristic regarding a reception environment of the GNSS regarding the strength of the GNSS signal, when there are a small number of GNSS satellites, the weight for determining the reception environment of the GNSS signal to be a weak electric field may be assigned; when there are a large number of GNSS satellites, the weight for determining the reception environment of the GNSS signal to be a strong electric field may be assigned. Regarding the error radius of the GNSS signal data, when the error radius is wide, the weight for determining the reception environment of the GNSS signal to be a weak electric field may be assigned; when the error radius is narrow, the weight for determining the reception environment of the GNSS signal to be a strong electric field may be assigned. Regarding the location variation of the GNSS signal data, when the location variation is significant, the weight for determining the reception environment of the GNSS signal to be a weak electric field may be assigned; when the location variation is insignificant, the weight for determining the reception environment of the GNSS signal to be a strong electric field may be assigned. Regarding the HDOP of the GNSS signal data, when the HDOP is high, the weight for determining the reception environment of the GNSS signal to be a weak electric field may be assigned; when the HDOP is low, the weight for determining the reception environment of the GNSS signal to be a strong electric field may be assigned. Regarding the SNR of the GNSS signal data, when the SNR is low, the weight for determining the reception environment of the GNSS signal to be a weak electric field may be assigned; when the SNR is high, the weight for determining the reception environment of the GNSS signal to be a strong electric field may be assigned. Regarding the multipath possibility of the GNSS signal, when the multipath possibility is high, the weight for determining the reception environment of the GNSS signal to be a weak electric field may be assigned; when the multipath possibility is low, the weight for determining the reception environment of the GNSS signal to be a strong electric field may be assigned. In various embodiments, as illustrated in FIG. 8, a multipath means that a GNSS satellite signal is reflected or diffracted by an obstacle (for example, a building or a tree) before arriving at a. GNSS module, and a multipath signal combined with a visible-path signal may deform the correlation function of the GNSS module and may ultimately affect the discrimination function, thereby increasing a distance error. Therefore, the multipath may be used as a primary environmental factor for determining the reception environment of the GNSS signal data.

As shown in FIG. 9, to select a location calculation module, the method for selecting the location calculation module, according to various embodiments of the present disclosure, may use the number of GNSS satellites from which a GNSS signal arrives along a multipath among the information included in the GNSS signal data. For example, when there are a large number of multipath GNSS satellites, the first location calculation module 411 may be selected as a location calculation module to calculate location information of an electronic device and may calculate location information of an electronic device. When there are a small number of multipath GNSS satellites, the location calculation module to calculate the location information of the electronic device may be changed front the first location calculation module 411 to the second location calculation module 422, thereby calculating location information of the electronic device.

As shown in FIG. 10, the method for selecting the location calculation module, according to various embodiments of the present disclosure, may use information indicating a change in the exercising state of a user, which is other information that is included in the batched data, instead of using the information included in the GNSS signal data, in order to select a location calculation module. For example, when the user's exercising state is running, the first location calculation module 411 may be selected as a location calculation module to calculate location information of an electronic device and may calculate location information of an electronic device. Here, the calculation of the location information of the electronic device by the first location calculation module 411 may be performed every time the number of a plurality of data stacks included in the batched data reaches three hundred. When the user's exercising state changes from running to walking, the location calculation module to calculate the location information of the electronic device is changed from the first location calculation module 411 to the second location calculation module 422, thereby calculating location information of the electronic device. Here, the calculation of the location information of the electronic device by the second location calculation module 422 may be performed every time the number of a plurality of data stacks included in the batched data reaches thousand.

Exemplary embodiments of the present disclosure shown and described in this specification and the drawings correspond to specific examples presented in order to easily describe technical contents of the present disclosure and to help comprehension of the present disclosure, and are not intended to limit the scope of the present disclosure. Therefore, it should be construed that all modifications or modified forms drawn by the technical idea of the present disclosure in addition to the embodiments disclosed herein are included in the scope of the present disclosure.

What is claimed is:

1. An electronic device comprising:
   a communication module;
   a first processor including a first location calculation module; and
   a second processor including a second location calculation module,
   wherein the first processor is configured to:

identify attribute information on at least one application that is executed by the first processor and requests location information;

determine a location accuracy level on the basis of the identified attribute information on the at least one application; and select one of the first location calculation module or the second location calculation module to calculate a location of the electronic device using a signal obtained through the communication module according to the determined location accuracy level, wherein the second processor is configured to provide batched data, which comprises the signal obtained through the communication module, to the first location calculation module or the second location calculation module according to a preset condition.

2. The electronic device of claim 1, wherein the first processor is configured to select the first location calculation module when the determined location accuracy level is a first location accuracy level, and is configured to select the second location calculation module when the determined location accuracy level is a second location accuracy level.

3. The electronic device of claim 2, wherein the first location accuracy level indicates a relatively higher accuracy than the second location accuracy level.

4. The electronic device of claim 2, wherein when the second location calculation module is selected, the first processor is configured to transmit an instruction about location calculation to the second processor and to switch to a sleep mode.

5. The electronic device of claim 4, wherein the second processor is configured to provide location information calculated using the second location calculation module on the basis of the instruction to the first processor.

6. The electronic device of claim 1, wherein the first processor is configured to determine a characteristic of the signal obtained through the communication module further using at least one piece of information comprised in the signal and to select one of the first location calculation module or the second location calculation module on the basis of the determined characteristic of the signal.

7. The electronic device of claim 6, wherein the communication module comprises a Global Navigation Satellite System (GNSS) module, and the at least one piece of information comprised in the signal comprises at least one of GNSS signal strength, an error radius, location variation, horizontal dilution of precision (HDOP), a number of GNSS satellites, or possibility of multipath.

8. The electronic device of claim 6, wherein the first processor is configured to select the second location calculation module when a numerical value of the determined characteristic of the signal is a first signal level that exceeds a specified threshold value, and to select the first location calculation module when the numerical value of the determined characteristic of the signal is a second signal level that is below the specified threshold value.

9. The electronic device of claim 1 wherein the first location calculation module is configured to require a relatively shorter batching period than the second location calculation module.

10. A method for providing location information by an electronic device comprising a first processor including a first location calculation module and a second processor including a second location calculation module, the method comprising:

identifying attribute information on at least one application that is executed by the first processor and requests location information;

determining a location accuracy level on the basis of the identified attribute information on the at least one application;

selecting one of the first location calculation module or the second location calculation module to calculate a location of the electronic device using a signal obtained through a communication module according to the determined location accuracy level; and providing location information using the selected location calculation module wherein the second processor is configured to provide batched data, which comprises the signal obtained through the communication module, to the first location calculation module or the second location calculation module according to a preset condition.

11. A computer recording medium that stores an instruction which is executed by an electronic device comprising a first processor including a first location calculation module and a second processor including a second location calculation module, the instruction being configured to perform, using the first processor:

identifying attribute information on at least one application that is executed by the first processor and requests location information;

determining a location accuracy level on the basis of the identified attribute information on the at least one application;

selecting one of the first location calculation module or the second location calculation module to calculate a location of an electronic device using a signal obtained through a communication module according to the determined location accuracy level; and providing location information using the selected location calculation module wherein the second processor is configured to provide batched data, which comprises the signal obtained through the communication module, to the first location calculation module or the second location calculation module according to a preset condition.

* * * * *